Jan. 14, 1958     H. ERDMANN     2,819,804
APPARATUS FOR ORIENTING RETAINING RINGS
Filed June 22, 1955     4 Sheets-Sheet 1
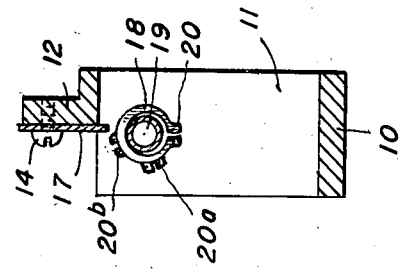
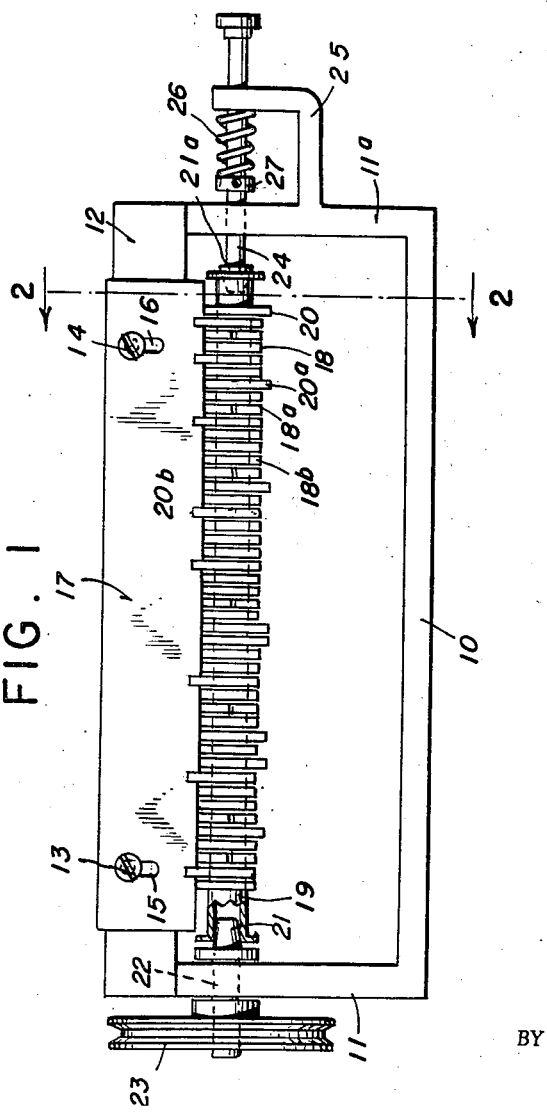
INVENTOR
HANS ERDMANN
BY
ATTORNEY Jan. 14, 1958 H. ERDMANN 2,819,804
APPARATUS FOR ORIENTING RETAINING RINGS
Filed June 22, 1955 4 Sheets-Sheet 2
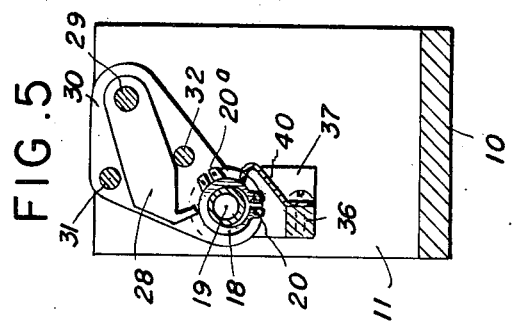
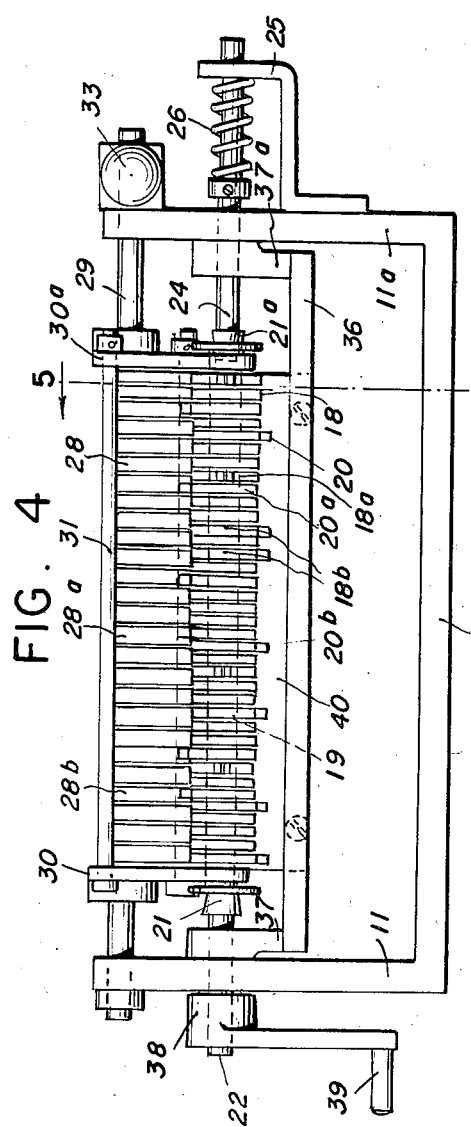
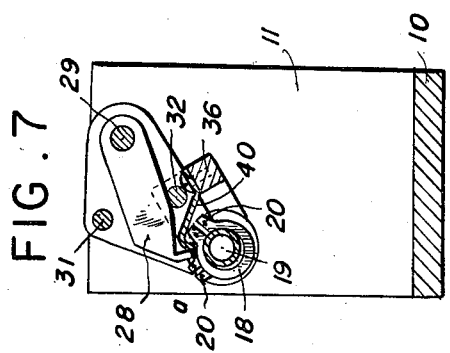
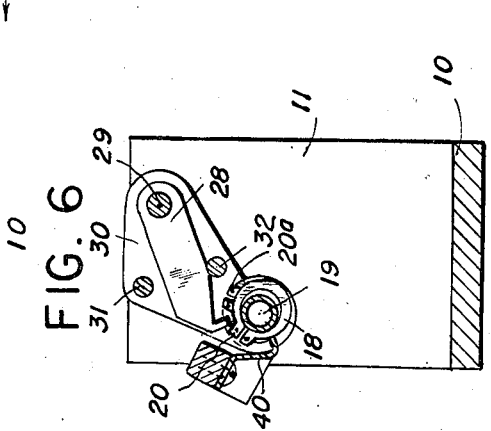
INVENTOR
HANS ERDMANN
BY
ATTORNEY Jan. 14, 1958    H. ERDMANN    2,819,804
APPARATUS FOR ORIENTING RETAINING RINGS
Filed June 22, 1955    4 Sheets-Sheet 3
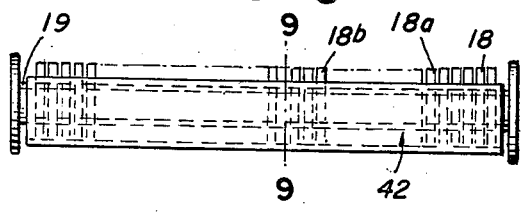
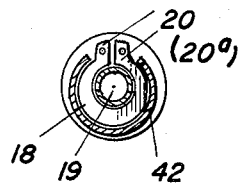
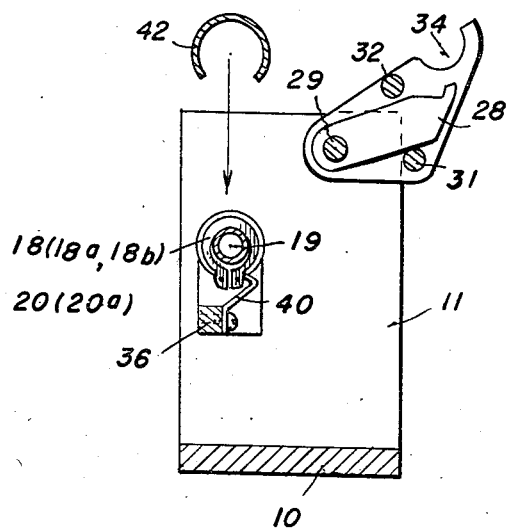
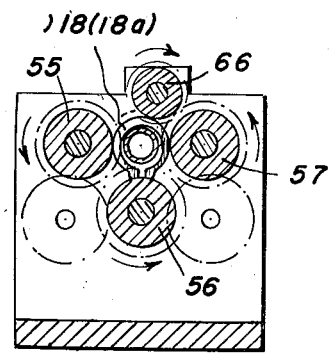
INVENTOR
HANS ERDMANN
BY *J. Harold Kissayne*
ATTORNEY Jan. 14, 1958
H. ERDMANN
2,819,804
APPARATUS FOR ORIENTING RETAINING RINGS
Filed June 22, 1955
4 Sheets-Sheet 4
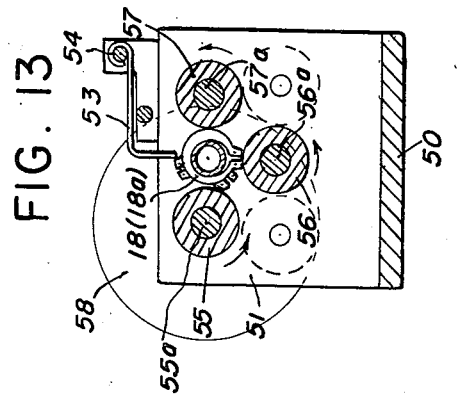
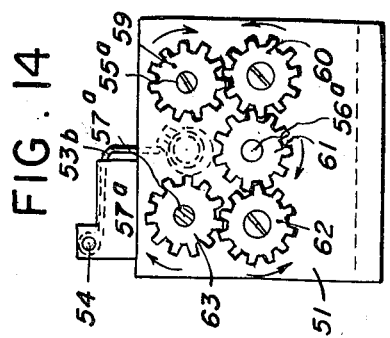
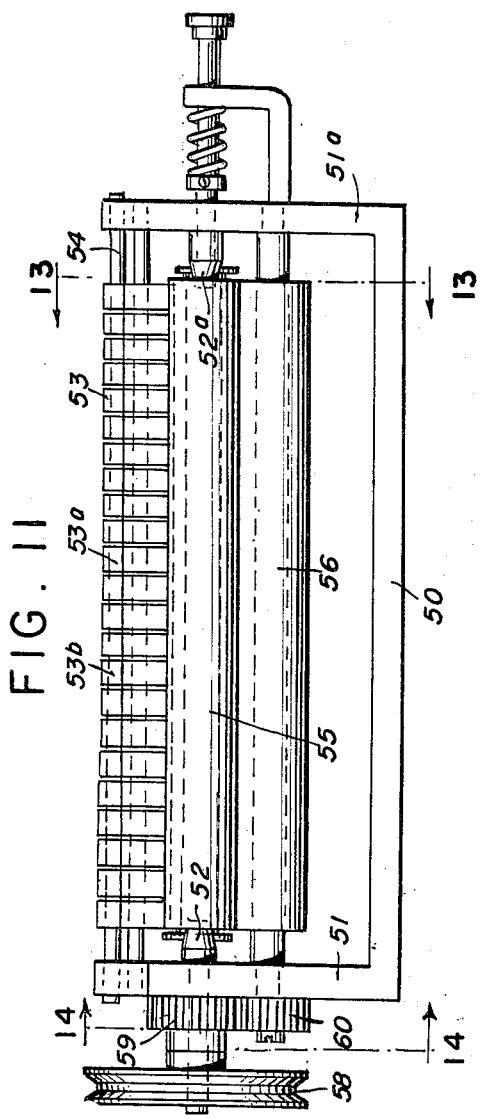
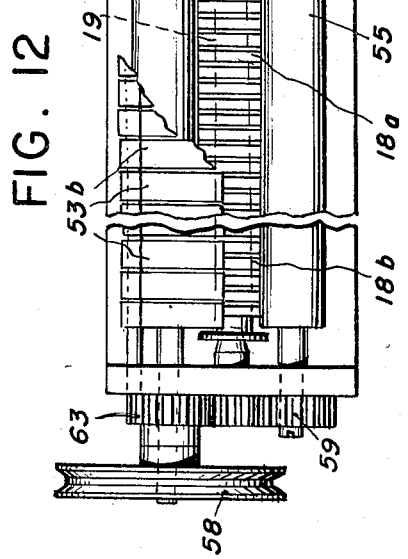
INVENTOR
HANS ERDMANN
BY
ATTORNEY

United States Patent Office 2,819,804
Patented Jan. 14, 1958

2,819,804

APPARATUS FOR ORIENTING RETAINING RINGS

Hans Erdmann, Maplewood, N. J., assignor to Waldes Kohinoor, Inc., Long Island City, N. Y., a corporation of New York Application June 22, 1955, Serial No. 517,295

4 Claims. (Cl. 214—1)

This invention relates to improvements in apparatus for orienting retaining rings, particularly open-ended retaining rings of the type having a gap between their free ends and being provided adjacent said ends with radially enlarged ears which are usually apertured for the reception of the tips of a plier-like tool used in handling and assembling such rings.

A recent development in the field of open-ended spring retaining rings characterized as above and which are widely used in forming artificial shoulders on shafts, pins and the like is that of apparatus for applying such rings on their shafts or pins, which does away with the older and very cumbersome procedure of manually applying said rings by spreading them over the ends of shafts and thereupon shifting them manually to the plane of the shaft grooves provided for their reception. While according to one form of such ring-applying apparatus there is no requirement that the rings be oriented preliminary to or in the course of their assembly, with other such applying apparatus it is necessary that the rings being assembled be invariably presented with their gaps in a predetermined angular position. Such of course requires that the retaining rings being assembled be oriented, i. e. turned so that their gaps always face in the same direction and, in the case of the plurality of retaining rings being prepared for assembly, of the gaps being axially aligned.

Stated broadly, a principal object of the present invention is the provision of simple, practical and thoroughly dependable means for orienting a plurality of open-ended spring retaining rings preliminary to supplying or feeding the rings to apparatus for effecting their assembly on grooved shafts, pins or the like.

A more particular object of the invention is the provision of apparatus of the stated character which is so constructed and arranged as to mount a plurality of the rings to be oriented in stack formation without regard to the angular relationship of the ring gaps and thereupon to effect turning of the stacked rings individually as required to effectively orient them, i. e. dispose them with their gaps extending in precise axial alignment.

Yet another object of the invention is the provision of apparatus for orienting open-ended retaining rings as aforesaid characterized by simple and effective means for arresting rotation of a plurality of open-ended retaining rings arranged in stack formation upon said rings being rotated to a fixed angular position in which their gaps are in axial alignment, operating in conjunction with means for rotating said rings against said arresting means, of a type which insures movement of all rings of the stack to fully oriented position.

The above and other objects and advantages of apparatus for orienting open-ended retaining rings according to the present invention will appear from the following detailed description, in which reference is made to the accompanying drawings illustrating various forms of ring-orienting apparatus as herein proposed, in which—

Fig. 1 is a front elevation of one form of apparatus for orienting open-ended retaining rings according to the present invention;

Fig. 2 is a section taken along line 2—2 of Fig. 1;

Figs. 3 and 4 are plan and front elevation views of another form of retaining ring orienting apparatus according to the invention;

Figs. 5, 6 and 7 are sections taken along line 5—5 of Fig. 4, which illustrates the wiper element for effecting rotation of the retaining rings against the arresting means in three of its working positions;

Fig. 8 is a front view illustrating an accessory in the form of a ring-holding sleeve for maintaining a stack of rings oriented on a tube, following their removal from the orienting apparatus shown in the preceding views;

Fig. 9 is a section taken along line 9—9 of Fig. 8;

Fig. 10 illustrates the Figs. 3 and 4 form of apparatus in its inactive position preliminary to applying the ring-holding sleeve shown in Fig. 8;

Figs. 11 and 12 are front elevation and top plan views, repsectively, of yet another form of retaining ring orienting apparatus according to the invention;

Fig. 13 is a section taken along line 13—13 of Fig. 11;

Fig. 14 is a left-end view of the apparatus shown in Fig. 11, with the driving pulley removed; and Fig. 15 is a section corresponding to Fig. 13 but illustrating a modified form of ring-rotation arresting means.

Referring to the drawings, apparatus for orienting open-ended retaining rings according to the Figs. 1 and 2 form illustratively comprises a rectangular frame having a base 10 and upright sides 11, 11a, which latter mount an L-shaped top piece 12 extending between the frame sides. Affixed to the front face of the top piece as by screws 13, 14 operating in elongated slots 15, 16 thereof is a ring-rotation arresting member 17 shown to be vertically disposed and to have the form of an elongated one-piece blade whose lower edge portion depends into the frame interior. A plurality of the retaining rings to be oriented which are designated 18, 18a, 18b, etc. are mounted in loose and hence individually rotatable stack formation on a mandrel 19, preferably comprising a paper tube, the rings being disposed with their radially enlarged end lugs or ears designated 20, 20a, 20b, etc. at random positions, i. e. pointing at any direction which they happen to take as the rings are mounted on the tube 19. Said tube, with a multiplicity of rings mounted thereon as illustrated, is adapted to be supported for rotation within the frame as by axially spaced friction-driving and supporting heads 21, 21a which are preferably conically shaped as is well known, of which the driving head 21 is carried at the inner end of a stub shaft 22 having bearing in upright frame side 11 and whose outer end carries a driving pulley 23, and the supporting head 21a is carried at the inner end of a pull shaft 24 having sliding bearing in the frame side 11a and in the vertical arm of an L-shaped extension 25. A spring 26 reactive between said vertical arm and a collar 27 affixed to said pull shaft 24 biases said shaft axially to the left (Fig. 1). Thus, the tube 19 and a supply of rings disposed thereon in stack formation may be simply mounted by pulling the shaft 24 outwardly against the force of spring 26, thereupon slipping the left end of the tube over the driving head 21, and, finally, with the tube held in axial alignment with the pull shaft 24 releasing said shaft so that its tube supporting head 21a may enter the other or right end of the tube. When so positioned and held, the tube may be positively driven as by means of a driving belt trained over the aforesaid pulley 23.

In operation of the above described apparatus, the blade 17 is adjusted vertically to a position such that its lower edge has slight clearance with respect to the outer peripheral edges of the ring bodies disposed on the tube 19, but which is also such that said edge provides an abutment disposed in the path of movement of the radially enlarged ring ears 20, 20a, 20b, etc. moving against same. When the tube 19 is rotated in clockwise direction, for example, the rings 18, 18a, 18b thereon are carried along by their friction until their further rotation is arrested through engagement of their corresponding ears against the blade 17, as indicated in Fig. 2. After a few turns of the tube, the corresponding ears of all of the rings will abut said blade, whereupon the rings are oriented, i. e. their gaps are axially aligned so that they in effect define a straight slot or channel extending along the ring stack. To maintain the rings oriented, a wire or other means may be threaded through the now aligned gaps, or through the ear apertures of one corresponding set of rings ears, which latter are also aligned. Thereupon the tube and supply of oriented rings may be removed from the apparatus and a fresh tube containing a supply of non-oriented rings substituted in its place.

Although generally effective, the above described apparatus has the disadvantage that it does not work smoothly when the rings carry lubricant which causes them to stick together and resist individual rotation. This disadvantage is avoided to a degree through the provision of means wiping over the outer periphery of the rings stacked on the tube and which is capable of engaging or hooking behind the rearwardly disposed ears of the individual rings, thereby to move said rings more or less positively towards and finally into engagement with the ring-rotation arresting blade. However, such operation requires that the ring-ear hooking means move behind the ears of all rings, regardless of their angular position on the tube, which would not be possible if a stiff or rigid one-piece blade corresponding to the aforesaid blade 17 were employed. Therefore, the embodiment illustrated in Figs. 3–7 and 10 was devised and found to be effective.

In this embodiment a tube 19 mounting a plurality of the rings 18, 18a, 18b, etc. to be oriented and which are disposed in loose stack formation thereon is supported in a frame consisting of a base 10 and upright sides 11, 11a by means of spaced supporting heads 21, 21a mounted on tube supporting shafts 22, 24, all as previously described, although the shaft 22 need not be and preferably is not positively driven as in the Figs. 1 and 2 modification. As distinguished from using a rigid one-piece abutment blade for arresting rotation of the rings, the present form employs a plurality of blades 28, 28a, 28b, etc. preferably having the form of pawl-like fingers which are loosely supported at their upper ends on a shaft 29 extending between and journaled for rotation in the frame sides 11, 11a. Adjacent its ends and inwardly of the frame sides, bracket arms 30, 30a are fixedly secured to the shaft 29 and extending between said bracket arms is a pair of spaced rods 31, 32 between which the plurality of pawl-like fingers 28, 28a, 28b, etc. are accommodated. One purpose of said rods 31, 32 is to permit controlled raising movement of said fingers for a purpose to be explained, and it will also be seen from Fig. 5 that the rod 32 normally supports the fingers 28, 28a, 28b, etc. at an elevation such that their free ends or noses are slightly spaced above or have light contact only with the peripheral edges of the ring bodies, yet are disposed in the path of ring ears moving against the same as the rings are rotated in clockwise direction.

The aforesaid assembly of the fingers 28, 28a, 28b, etc. may be raised bodily from an active or ring-engaging position shown in Fig. 5 to an inactive position shown in Fig. 10, as by means of a swing lever 33 affixed to an extended end of the shaft 29. Thus, turning of the shaft 29 in clockwise direction, by upward force applied to the swing lever 33 in corresponding direction, results in the bracket arms 30, 30a, the rods 31, 32 mounted thereby, and the plurality of fingers 28, 28a, 28b, etc. accommodated between said rods being swung bodily in corresponding clockwise direction to the inactive position illustrated in Fig. 10. This view also illustrates the recess 34 formed in the lower edge of each of the bracket arms 30, 30a which enables said bracket arms to move to their full lowered position over the ends of the tube 19.

According to the present embodiment, the means for imparting individual rotation to the plurality of open-ended retaining rings 18, 18a, 18b, etc. mounted as a loose stack on the tube 19 as aforesaid is shown to include a longitudinal bar 36 adapted for swinging or oscillatory movement about the axis of the tube 19. For this purpose the bar is carried by radius arms 37, 37a journaled on the aforesaid tube mounting shafts 22, 24, of which the arm 37 is adapted to turn with a hub 38 mounted externally of the frame, to which angular motion is adapted to be given as by means of a crank handle 39. Said bar 36 carries a radially inward, elongated ring engaging and rotating element 40, for convenience hereinafter referred to as a wiper element, whose preferred section is best seen in Figs. 5–7. As seen therein, the body of said wiper element, which is of one-piece rigid construction, rather than extending straightway to the rings mounted on the tube 19, is inclined away therefrom, and its inner edge portion is reversely bent so as to reach towards said rings. Thus, the inner edge portion of the wiper element 40 may be said to be shaped as a longitudinally extending claw or hook which, when the wiper element is swung in clockwise direction, is adapted normally to ride or wipe the peripheral edges of the ring bodies mounted on the tube 19, and which is also adapted to hook behind the following ring ears in its path and positively rotate the rings thereof until their advance ears abut against the front (left) edge of the nose or free ends of the fingers 28, 28a, 28b, etc. in the path of said rings. It will of course be understood that the section of the body of the wiper 40 may be varied, so long as it is capable of positively engaging behind the ring ears and rotating their rings until said ears abut the front edges of said fingers. To perform its ultimate function as aforesaid, the wiper may be and usually is called upon to act on rings turned at any angle and whose ears are accordingly disposed in both the clockwise and counterclockwise paths of wiper movement. However, the described arrangement is such that with a few actuations of the wiper in opposite directions, i. e. oscillations, it turns all rings to a corresponding angular position in which their advance ears abut the front (left) edge of the nose or free ends of the fingers 28, 28a, 28b, etc. and hence to an oriented position according to the invention.

The above action of the wiper element 40 and fingers 28, 28a, 28b, etc. is illustrated in part in Figs. 5, 6 and 7, of which Fig. 5 shows the bar 36 and wiper element 40 in normal position in which said bar is disposed below the stack of rings to be oriented mounted on the tube 19 and said wiper element inclines upwardly and to the right side of the ring stack. If now the bar 36 and wiper element 40 are swung or oscillated in clockwise direction, the inner edge of the wiper element acting as a claw moves all rings whose ears (typified by the ears designated 20) are in the path thereof against the front edges of the nose or free ends of such of the pawl-like fingers 28, 28a, 28b, etc. as are lined up therewith, said edges forming a rigid abutment for said ears consequent to the illustrated mounting of the fingers, all as illustrated in Fig. 6.

To rotate rings whose ears (typified by the ears 20a, Fig. 6) are disposed to the rear or counterclockwise of the wiper element to a corresponding and hence oriented position, it is now necessary to swing the wiper element 40 in counterclockwise direction as by use of the crank handle 39. During the course of such wiper element movement, its inner edge engages on said ears 20a and positively rotates their rings in counterclockwise direction past the nose or free ends of the fingers aligned therewith, the pivoted mounting of the fingers enabling them to raise the limited amount as to permit the aforesaid ring passage when they are abutted by the ring ears moving against the rear edges of their nose or free ends. With all ring ears now having the positions corresponding to the ring ears 20a, which have moved counterclockwise past the fingers as above, or to the ring ears 20, whose rings may have been drawn in counterclockwise direction by movement of the wiper element 40 in corresponding direction as in Fig. 7, repeat clockwise rotation of the wiper element now rotates all rings until their advance ears abut the front edges of the nose or free ends of the fingers whereupon the rings are oriented according to the invention.

Thereafter to maintain the rings properly oriented on the tube 19, the aforesaid finger assembly may be swung bodily to its inactive position shown in Fig. 10, whereupon the wiper element 40 may be swung over-center in clockwise direction to its initial or starting position shown both in Figs. 5 and 10. In this position orientation of the rings is maintained but the slot or channel of the ring stack defined by the axially aligned gaps faces downwardly. Thereupon, a split sleeve 42 made of resilient material and of length corresponding to that of the tube may be pushed over the stack of oriented rings from above, as diagrammatically illustrated in Fig. 10, the sleeve fitting the stack of rings sufficiently closely as to maintain the individual rings thereof against turning. Thereupon the tube, the oriented stack of rings thereon, and the enclosing sleeve 42 may be removed from the apparatus and handled as a unit or package characterized as in Fig. 8.

Figs. 11–14 illustrate yet another form of retaining-ring orienting apparatus of the invention. According thereto, a tube 19 mountnig a plurality of the retaining rings 18, 18a, 18b, etc. to be oriented and which are disposed as heretofore in loose stack formation on the tube, is supported in a frame (similar to the previously described frame) having a base 50 and upright sides 51, 51a by means of supporting heads 52, 52a corresponding to the tube supporting heads 21, 21a aforesaid. The means for arresting rotation of the rings illustratively comprises a plurality of L-shaped blades 53, 53a, 53b, etc. pivotally mounted above the tube, as on a rod 54 extending between the frame sides and extending through an eye formed at the end of one corresponding leg of said blades, so that the other leg depends vertically and is biased by gravity toward the tube 19, thereby to bear lightly on the rings stacked on the tube. Rotation of the rings is accomplished by means of a plurality (three) of positively driven rollers, designated 55, 56, 57, mounted on shafts 55a, 56a, 57a, respectively, journaled in the frame sides and whose axes are disposed parallel to that of the mounted tube 19. The spacing between the peripheral surfaces of said rollers and of the tube is sufficient to accommodate comfortably the radial thickness of the bodies of the rings mounted on the tube, but is less than that of said radial thickness plus extra thickness of the ring ears. However, the rollers 55, 56, 57 are surfaced with elastic material such as rubber, so that the ring ears may dig into the rollers in their movement past the same, consequent to which the rings are rotated the amount as to bring their ears in abutting relation with the blades 53, 53a, 53b, etc. with which the rings are individually aligned.

To effect such rotation of the rings, the rollers 55, 56, 57 must be driven in the same direction (counterclockwise, Fig. 13). Accordingly, and as shown in Fig. 14, drive from a belt (not shown) is to pulley 58 (Fig. 11) fast on roller shaft 55a, through said shaft to pinion 59, also fast thereon, through idler pinion 60 in mesh with said pinion 59 to pinion 61 fast on the roller shaft 56a, and through idler pinion 62 in mesh with said pinion 61 to pinion 63 fast on the roller shaft 57a. By such an arrangement, rollers 55, 56 and 57 are positively driven in the same direction as required.

Fig. 15 suggests a variant of the Figs. 11–14 form of apparatus according to which the ring-rotation arresting means comprises roller 66 having a hard surface which is disposed in the path of movement of the rotating ring ears. Such an arresting roller may be stationary or it may idle or it may be driven in opposite direction to that of the rollers 55, 56, 57, as by means of a pinion (not shown) meshing with one of the pinions 59, 61.

Without further analysis, it will be seen that the various forms of retaining-ring orienting apparatus as described and illustrated satisfy the objectives of the invention as explained in the foregoing. However, it will be appreciated that many changes could be made in carrying out the above constructions without departing from the scope of the invention, and it is intended that all matter contained in the above description or shown in the accompanying drawing shall be interpreted as illustrative and not in a limiting sense.

I claim:

1. Apparatus for orienting a plurality of open-ended spring retaining rings of the type having a gap between their open ends and which are provided adjacent said ends with radially enlarged ears comprising, in combination, means mounting a plurality of said retaining rings in stack formation and for rotation individually about the stack axis, means extending along the stack and being disposed in the path of movement of said ears for arresting rotation of said rings through abutment of the ring ears therewith, said arresting means comprising a plurality of depending pawl-like fingers which are pivotally mounted at their outer ends for limited pivotal movement and whose inner ends extend into the path of movement of the ring ears, and means for rotating said rings about the stack axis in a direction as to bring corresponding ears of the plurality of rings into engagement with said arresting means and thereby the gaps of the plurality of rings into axial alignment.

2. Apparatus as set forth in claim 1, wherein means are provided for swinging the plurality of fingers in unison from their ring-rotation arresting position as aforesaid to an inactive position.

3. Apparatus for orienting a plurality of open-ended spring retaining rings of the type having a gap between their open ends and which are provided adjacent said ends with radially enlarged ears comprising, in combination, means mounting a plurality of said retaining rings in stack formation and for rotation individually about the stack axis, means extending along the stack and including a plurality of fingers depending into the path of movement of said ears for arresting rotation of said rings through abutment of the ring ears therewith, and means for rotating said rings about the stack axis in a direction as to bring corresponding ears of the plurality of rings into engagement with said arresting fingers and thereby the gaps of the plurality of rings into axial alignment, said last means comprising a member mounted for swinging movement about the stack axis outwardly of the stack of rings, and a wiper extending inwardly from said member to said rings, said wiper having a claw-like inner edge portion positioned to wipe over the edges of the bodies of the rings of the stack thereof but to hold to the radially enlarged ears of said rings, thereby to rotate the latter responsively to swinging movement of said member.

4. Apparatus as set forth in claim 3, wherein the ring-rotation arresting fingers are shaped as pawls whose inner ends extend into the path of movement of the ring ears, said fingers providing rigid abutments for the ears of rings moving thereagainst in one direction and being pivotally mounted at their outer ends for movement out of the path of the ears of rings moving thereagainst in the opposite direction, and wherein the means for rotating said rings includes a member extending along the stack and means mounting same for oscillating movement about the axis thereof and a wiper element extending inwardly from said member to the peripheries of the rings of said stack, the construction and arrangement being such that movement of the wiper element in said one direction effects rotation of those rings whose ears are disposed in the path of movement of its said inner edge portion until said ears engage on corresponding pawl-like fingers, and that movement of said wiper element in the opposite direction effects rotation of those rings whose ears are disposed in the path of movement thereof against and past said fingers, thereby to condition the apparatus to rotate all said rings in corresponding direction upon the wiper element being again actuated in said one direction.

References Cited in the file of this patent

UNITED STATES PATENTS 1,935,236     Baker _____ Nov. 14, 1933